United States Patent
Xu et al.

(10) Patent No.: US 10,809,736 B2
(45) Date of Patent: Oct. 20, 2020

(54) ST-GRAPH LEARNING BASED DECISION FOR AUTONOMOUS DRIVING VEHICLE

(71) Applicant: Baidu USA LLC, Sunnyvale, CA (US)

(72) Inventors: Kecheng Xu, Sunnyvale, CA (US); Haoyang Fan, Sunnyvale, CA (US); Yajia Zhang, Sunnyvale, CA (US); Qi Luo, Sunnyvale, CA (US); Jiacheng Pan, Sunnyvale, CA (US); Jinghao Miao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 123 days.

(21) Appl. No.: 16/233,494

(22) Filed: Dec. 27, 2018

(65) Prior Publication Data

US 2020/0209872 A1    Jul. 2, 2020

(51) Int. Cl.
*G05D 1/00* (2006.01)
*G05D 1/02* (2020.01)
(Continued)

(52) U.S. Cl.
CPC ......... *G05D 1/0221* (2013.01); *B60W 40/072* (2013.01); *G05D 1/0088* (2013.01);
(Continued)

(58) Field of Classification Search
CPC ........... B60W 30/095; B60W 30/0956; B60W 60/0011; G05D 1/0088; G05D 1/0217;
(Continued)

(56) References Cited

U.S. PATENT DOCUMENTS 9,761,036 B2 * 9/2017 Rzeszotarski ........... G06T 13/20
10,503,760 B2 * 12/2019 Eade .................. G06K 9/00825
(Continued)

OTHER PUBLICATIONS

Predicting origin-destination ride-sourcing demand with a spatio-temporal encoder-decoder residual multi-graph convolutional network; Jintao Ke, X Qin, H Yang, Z Zheng, Z Zhu, J Ye—arXiv preprint arXiv . . . , 2019—arxiv.org (Subjects: Signal Processing (eess.SP); Machine Learning (cs.L).*
(Continued)

*Primary Examiner* — Cuong H Nguyen
(74) *Attorney, Agent, or Firm* — Womble Bond Dickinson (US) LLP

(57) ABSTRACT

In one embodiment, a data processing system for an autonomous driving vehicle (ADV) includes a processor, and a memory coupled to the processor to store instructions, which when executed by the processor, cause the processor to perform operations. The operations include generating a station-time (ST) graph based on perception data obtained from one or more sensors of the ADV, the ST graph including representing a location of an obstacle at different points in time, obtaining a tensor based on the ST graph, the tensor including a plurality of layers, the plurality of layers including a first layer having data representing one or more obstacles on a path in which the ADV is moving, applying a machine-learning model to the plurality of layers of the tensor to generate a plurality of numerical values, the plurality of numerical values defining a potential path trajectory of the ADV, and determining a path trajectory of the ADV based on the plurality of numerical values.

20 Claims, 10 Drawing Sheets

(51) Int. Cl.
    *G06N 20/00*    (2019.01)
    *G06N 3/08*     (2006.01)
    *G06K 9/00*     (2006.01)
    *B60W 40/072*   (2012.01)
    *G06N 5/04*     (2006.01)
    *B60W 60/00*    (2020.01)
    *B60W 30/095*   (2012.01)

(52) U.S. Cl.
    CPC ........... *G06K 9/00805* (2013.01); *G06N 3/08* (2013.01); *G06N 5/046* (2013.01); *G06N 20/00* (2019.01); *B60W 30/095* (2013.01); *B60W 30/0956* (2013.01); *B60W 60/0011* (2020.02); *B60W 2555/60* (2020.02); *G05D 2201/0213* (2013.01)

(58) Field of Classification Search
    CPC .... G05D 1/00; G05D 1/02; G05D 2201/0213; G06K 9/0805; G06K 9/00825; G06N 3/0603; G06N 3/04; G06N 3/06
    USPC ......................................... 701/23; 342/357.23
    See application file for complete search history.

(56) References Cited

U.S. PATENT DOCUMENTS

| | | | | |
|---|---|---|---|---|
| 10,515,321 | B2* | 12/2019 | Zhu | G05D 1/0223 |
| 10,521,913 | B2* | 12/2019 | Eade | G06F 16/29 |
| 10,571,921 | B2* | 2/2020 | Fan | B60W 30/00 |
| 10,591,926 | B2* | 3/2020 | Fan | G06K 9/00798 |
| 10,606,277 | B2* | 3/2020 | Fan | G05D 1/0223 |
| 2008/0151913 | A1* | 6/2008 | El-Damhougy | H04B 7/18584 370/401 |
| 2012/0154210 | A1* | 6/2012 | Landau | G01S 19/04 342/357.23 |
| 2012/0154214 | A1* | 6/2012 | Leandro | G01S 19/04 342/357.27 |
| 2012/0154215 | A1* | 6/2012 | Vollath | G01S 19/43 342/357.49 |
| 2012/0162007 | A1* | 6/2012 | Leandro | G01S 19/44 342/357.42 |
| 2012/0163419 | A1* | 6/2012 | Seeger | G01S 19/04 375/144 |
| 2012/0286991 | A1* | 11/2012 | Chen | G01S 19/32 342/357.23 |
| 2018/0307984 | A1* | 10/2018 | Koker | G06N 3/08 |
| 2019/0079523 | A1* | 3/2019 | Zhu | G08G 1/16 |
| 2019/0079528 | A1* | 3/2019 | Zhu | B60W 30/143 |
| 2019/0080266 | A1* | 3/2019 | Zhu | G01C 21/3453 |
| 2019/0086925 | A1* | 3/2019 | Fan | B60W 30/02 |
| 2019/0086930 | A1* | 3/2019 | Fan | G05D 1/0223 |
| 2019/0086932 | A1* | 3/2019 | Fan | G08G 1/16 |
| 2019/0196485 | A1* | 6/2019 | Li | G08G 1/166 |
| 2019/0235516 | A1* | 8/2019 | Zhang | G05D 1/0088 |
| 2019/0243370 | A1* | 8/2019 | Li | B60W 30/08 |
| 2019/0278276 | A1* | 9/2019 | Zhang | G05D 1/0214 |
| 2019/0278284 | A1* | 9/2019 | Zhang | G06F 9/545 |
| 2019/0303457 | A1* | 10/2019 | Eade | G06F 16/284 |
| 2019/0304097 | A1* | 10/2019 | Eade | G06T 7/162 |
| 2019/0315357 | A1* | 10/2019 | Zhang | G05D 1/0238 |
| 2019/0317509 | A1* | 10/2019 | Zhang | G05D 1/0088 |
| 2019/0317512 | A1* | 10/2019 | Zhang | G05D 1/0088 |
| 2019/0317515 | A1* | 10/2019 | Zhang | B60W 30/0953 |
| 2019/0317520 | A1* | 10/2019 | Zhang | G05D 1/0274 |
| 2019/0382031 | A1* | 12/2019 | Hu | B60W 50/0205 |
| 2019/0391585 | A1* | 12/2019 | Zhang | B60W 30/09 |
| 2020/0031340 | A1* | 1/2020 | Tao | B60W 30/146 |

OTHER PUBLICATIONS

Deep Tensor ADMM-Net for Snapshot Compressive Imaging; Jiawei Ma, Xiao-Yang Liu, Zheng Shou, Xin Yuan; The IEEE International Conference on Computer Vision (ICCV), 2019, pp. 10223-10232.*
Spatiotemporal multi-graph convolution network for ride-hailing demand forecasting; X Geng, Y Li, L Wang, L Zhang, Q Yang, J Ye . . . —Proceedings of the AAAI . . . , 2019—aaai.org.*
Graph edge convolutional neural networks for skeleton-based action recognition; X Zhang, C Xu, X Tian, D Tao—IEEE transactions on neural . . . , 2019—ieeexplore.ieee.org.*

* cited by examiner

ST-GRAPH LEARNING BASED DECISION FOR AUTONOMOUS DRIVING VEHICLE

TECHNICAL FIELD

Embodiments of the present disclosure relate generally to operating autonomous vehicles. More particularly, embodiments of the disclosure relate to autonomous driving decisions using learning based ST-graph decisions.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

Decisions are a very important part in autonomous driving to guide the autonomous vehicle's movement according to safety and comfort parameters. In one platform, autonomous driving decisions are based on a ST-graph with rule-based programming methods (for example, dynamic programming and quadratic programming methods). This approach needs a lot of experiments and parameter tuning. Furthermore, this approach does not take advantage of the large amount of road test data and many experiments are needed to tune the parameters manually.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, an autonomous driving vehicle (ADV) includes a decision and planning system which generates a station-time (ST) graph based on perception data obtained from one or more sensors in the ADV. The ST graph includes a representation of obstacles on the road, for example, other vehicles and stop lines. The stop lines may include traffic rules such as traffic lights and stop signs. The ST graph is used to obtain a multi-layered tensor including a first layer having data representing one or obstacles on a path in which the ADV is moving. A machine-learning model is applied to the multi-layered tensor to generate numerical values which define a potential path trajectory of the ADV. The numerical values are used to determine a path trajectory of the ADV by the decision and planning system. In one aspect, the machine-learning model includes a Convolutional Neural Network (CNN) to learn a discretized probability distribution of all (t, s) pairs which is then used by the decision and planning system to determine the path trajectory of the ADV.

Figure 1:
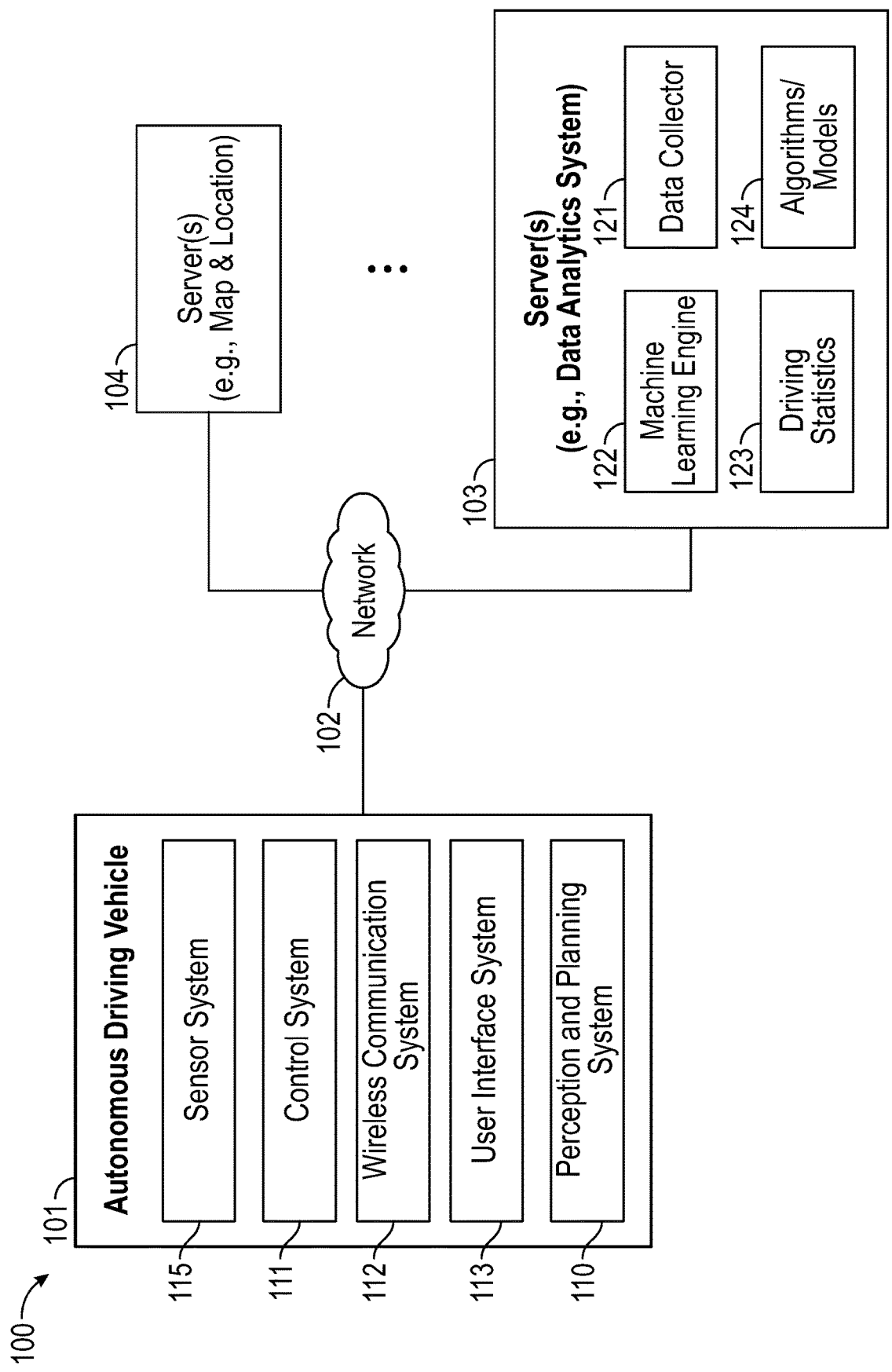
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle or autonomous driving vehicle (ADV) 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
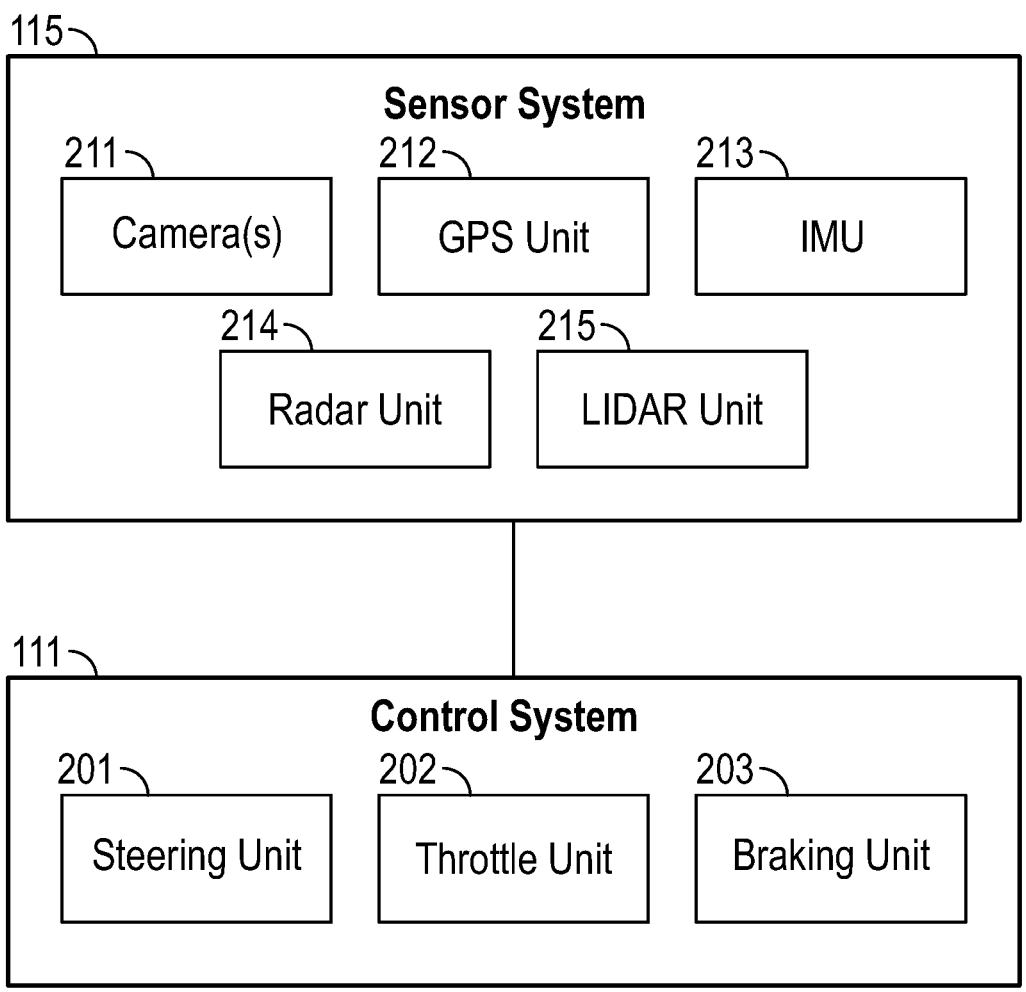
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes.

Algorithms 124 can then be uploaded on ADVs to be utilized during autonomous driving in real-time.

Figure 3A:
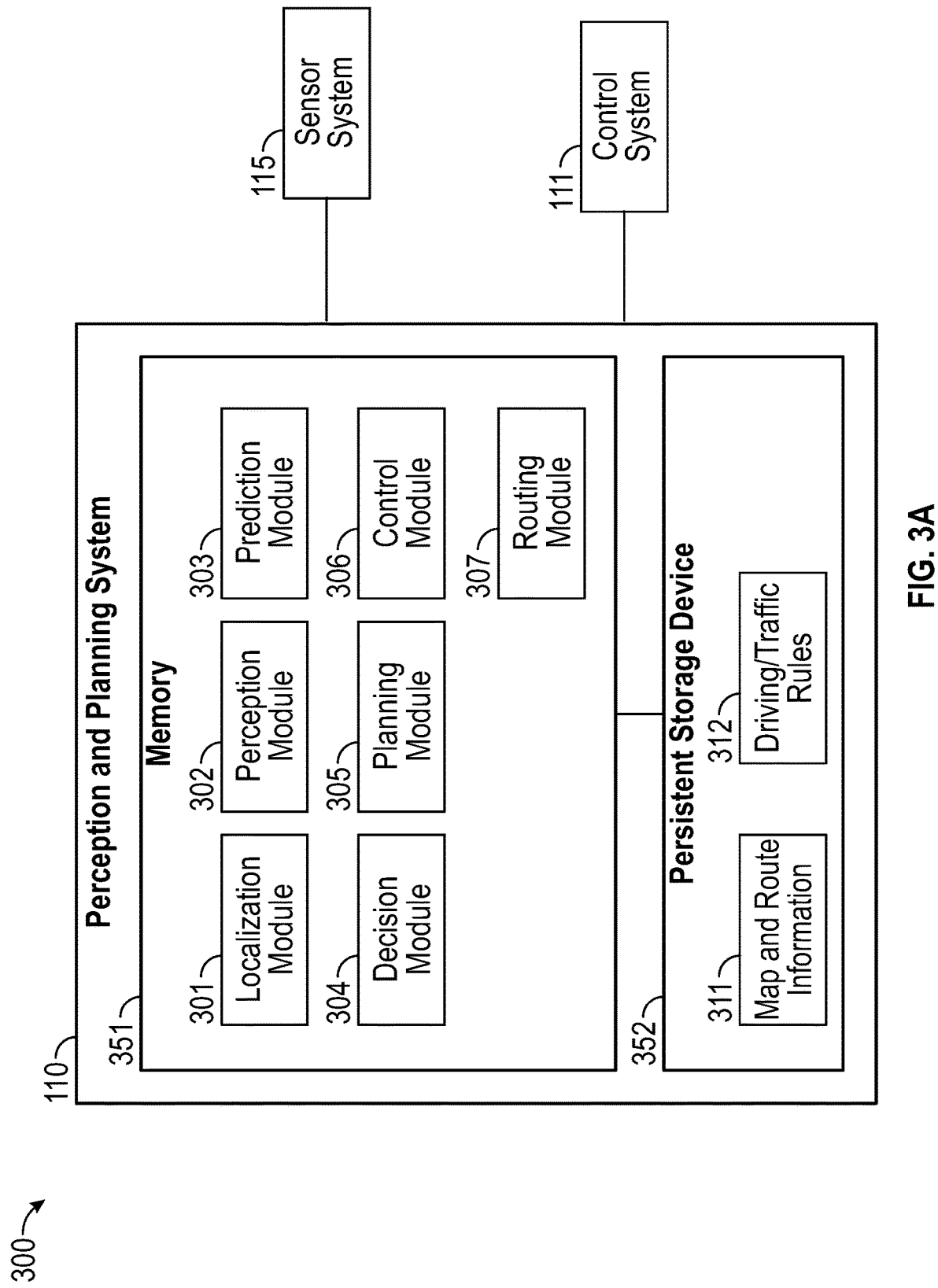
FIGS. 3A-3B are block diagrams illustrating an example of a perception and planning system used with an autonomous vehicle according to one embodiment.
Figure 3B:
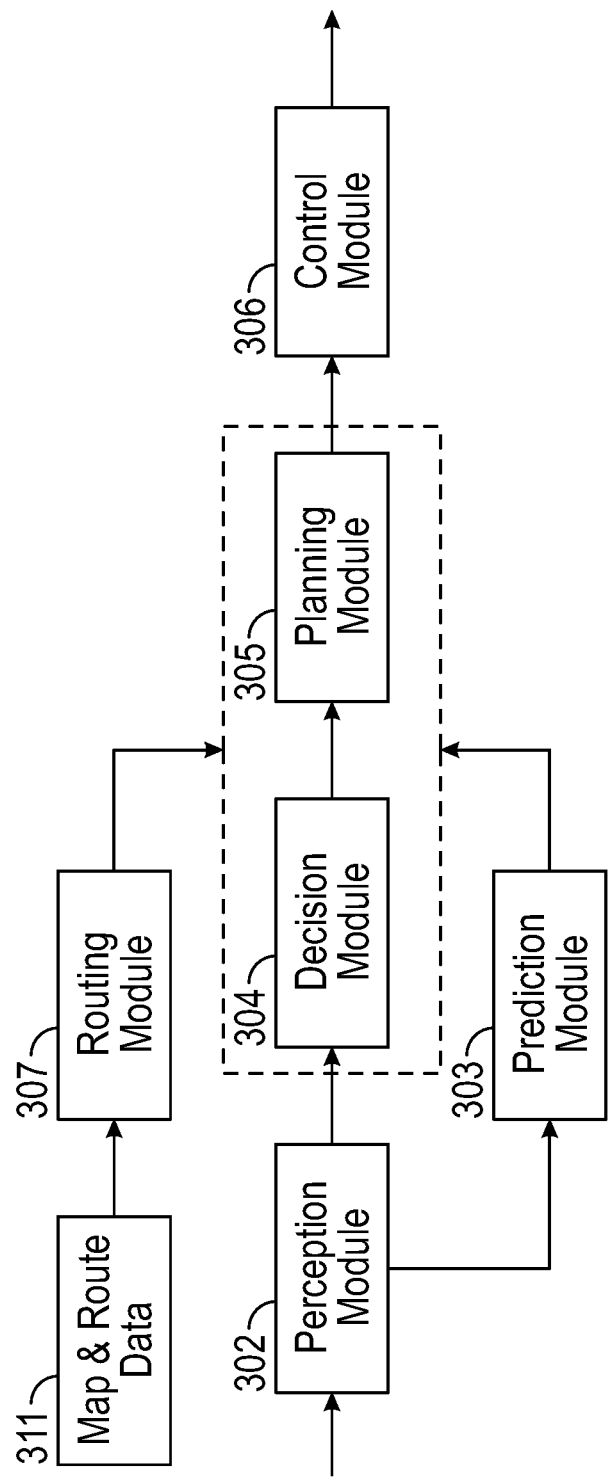

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

The term of polynomial optimization or polynomial fit refers to the optimization of the shape of a curve (in this example, a trajectory) represented by a polynomial function (e.g., quintic or quartic polynomial functions), such that the curve is continuous along the curve (e.g., a derivative at the joint of two adjacent segments is obtainable). In the field of autonomous driving, the polynomial curve from a starting point to an end point is divided into a number of segments (or pieces), each segment corresponding to a control point (or reference point). Such a segmented polynomial curve is referred to as a piecewise polynomial. When optimizing the piecewise polynomial, a set of joint constraints and a set of boundary constraints between two adjacent segments have to be satisfied, in addition to the set of initial state constraints and end state constraints.

The set of joint constraints includes positions (x, y), speed, heading direction, and acceleration of the adjacent segments have to be identical. For example, the ending position of a first segment (e.g., leading segment) and the starting position of a second segment (e.g., following segment) have to be identical or within a predetermined proximity. The speed, heading direction, and acceleration of the ending position of the first segment and the corresponding speed, heading direction, and acceleration of the starting position of the second segment have to be identical or within a predetermined range. In addition, each control point is associated with a predefined boundary (e.g., 0.2 meters left and right surrounding the control point). The polynomial curve has to go through each control point within its corresponding boundary. When these two set of constraints are satisfied during the optimization, the polynomial curve representing a trajectory should be smooth and continuous.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
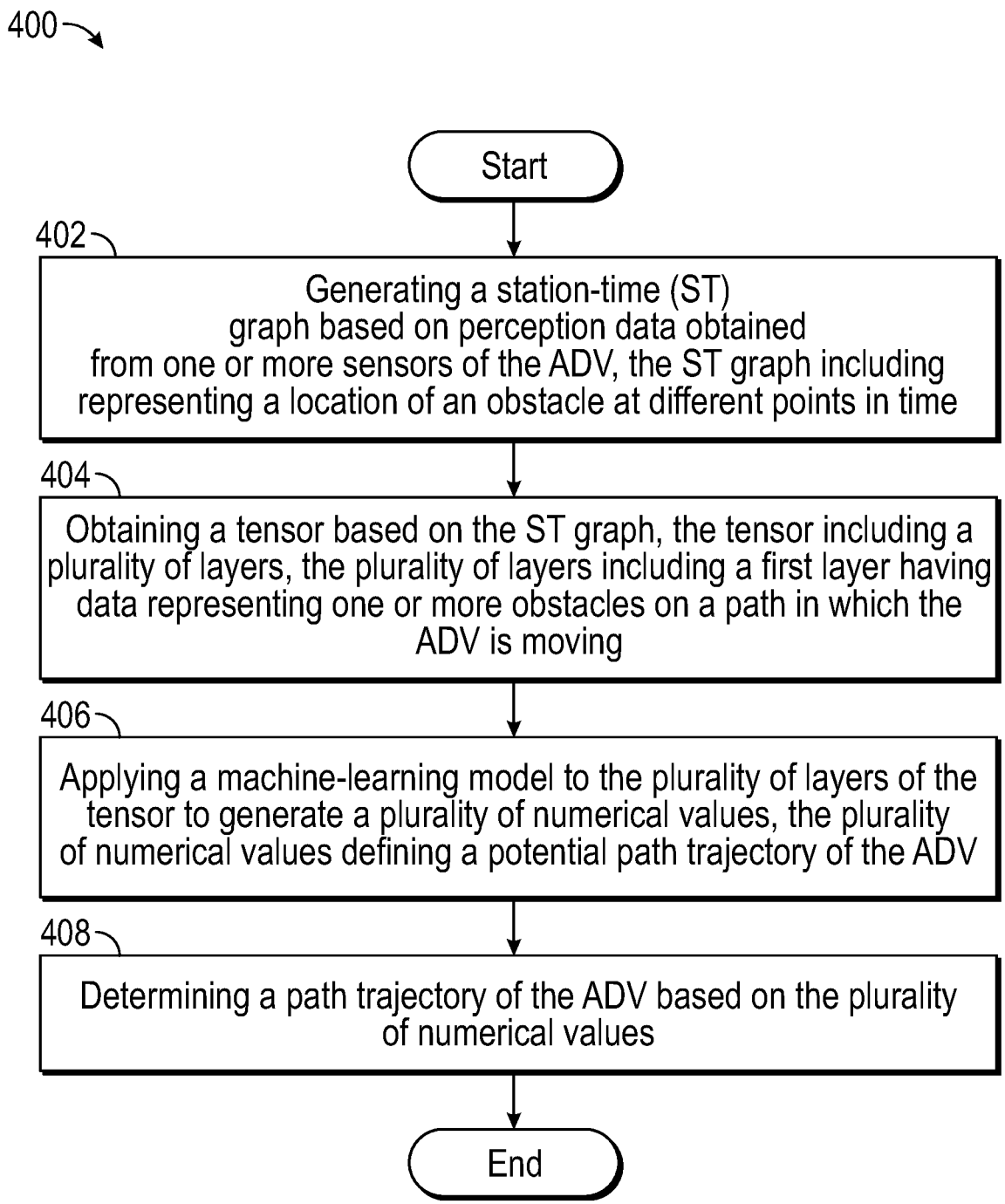
FIG. 4 is a flow diagram to determine a path trajectory for an autonomous vehicle according to one embodiment.

FIG. 4 is a flow diagram 400 to determine a path trajectory for an autonomous driving vehicle according to one embodiment. The process shown in FIG. 4 may be implemented by perception and planning system 110 of FIG. 1 and FIGS. 3A-3B and in particular, decision module 304 shown in FIGS. 3A-3B. Flow diagram 400 includes generating a station-time (ST) graph (see 514, FIG. 5B) based on perception data obtained from one or more sensors of the ADV, the ST graph including representing a location of an obstacle at different points in time at 402, obtaining a tensor (see 600, FIG. 6) based on the ST graph, the tensor including a plurality of layers, the plurality of layers including a first layer 602 (see FIG. 6) having data representing one or more obstacles on a path in which the ADV is moving at 404, applying a machine-learning model to the plurality of layers of the tensor to generate a plurality of numerical values (see FIG. 7), the plurality of numerical values defining a potential path trajectory of the ADV at 406, and determining a path trajectory of the ADV based on the plurality of numerical values at 408. The perception data may be obtained from one or more sensors of the ADV, described above, for example, one more sensors included in sensor system 115 of FIG. 2.

Figure 5A:
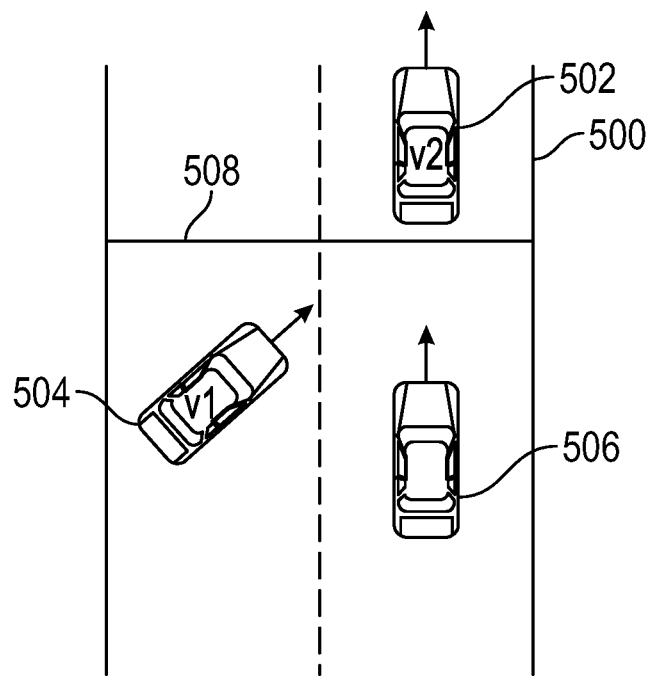
FIG. 5A illustrates an example of a road scenario with obstacles facing an autonomous vehicle.

FIG. 5A illustrates an example of a road scenario with obstacles encountered by an autonomous driving vehicle. As shown in FIG. 5A, ADV 506 is moving on a path 500 (for example, a road having multiple lanes). ADV 506 may be the ADV shown in FIG. 1. ADV 506 encounters various obstacles such as vehicles V1 (504) and V2 (502) and a stop line 508 which includes objects which may cause the ADV to stop. For example, stop lines may be defined by one or more traffic rules such as a traffic light, a stop sign, or a pedestrian walkway. As shown in FIG. 5A, a second vehicle 502 is moving in front of the ADV and a first vehicle 504 is moving into the lane occupied by the ADV. Based on this road scenario, the ADV generates an ST-graph to be described below.

Figure 5B:
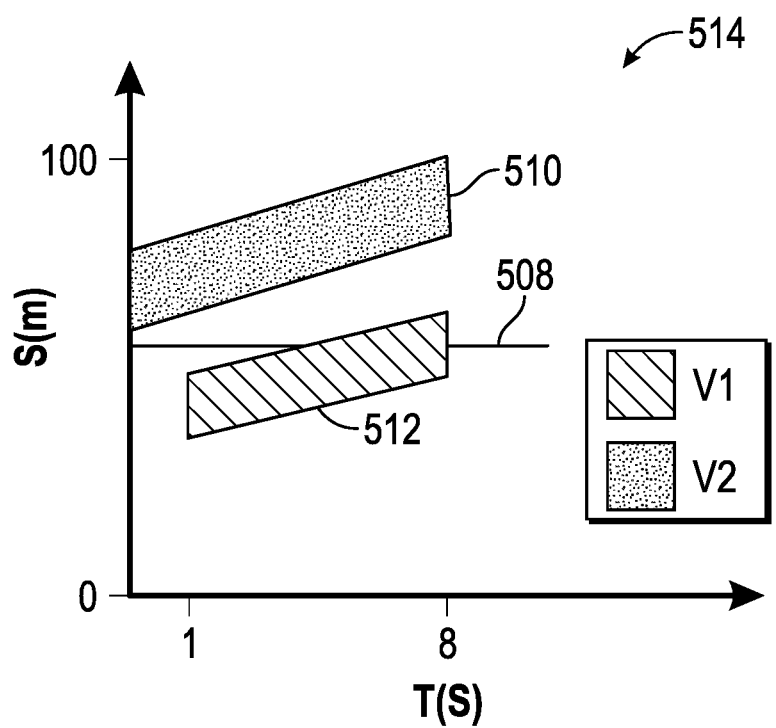
FIG. 5B is an ST-graph of the road scenario shown in FIG. 6A.

FIG. 5B is an ST-graph of the road scenario shown in FIG. 6A. The horizontal axis T represents time in seconds and the vertical axis S represents distance or position in meters. The example shown in FIG. 5B includes a time interval of 8 seconds and a distance of 100 meters. ST-graph 514 includes a plot 508 for the first vehicle V1, a plot 510 for the second vehicle 510, and a stop line 508. The slope of each plot represents the speed of each vehicle and the length of each plot in the S direction represents the length of each vehicle. ST-graph 514 includes a representation of a location of an obstacle (for example, first vehicle V1 or second vehicle V2) at different points in time relative to the ADV positioned generally at the origin of the ST-graph. For example, a time resolution of 0.1 seconds and a distance resolution of 0.5 meters can be used to generate a 200×80 pixel image of the ST-graph to be used to obtain a multi-layer tensor to be described below.

Figure 6:
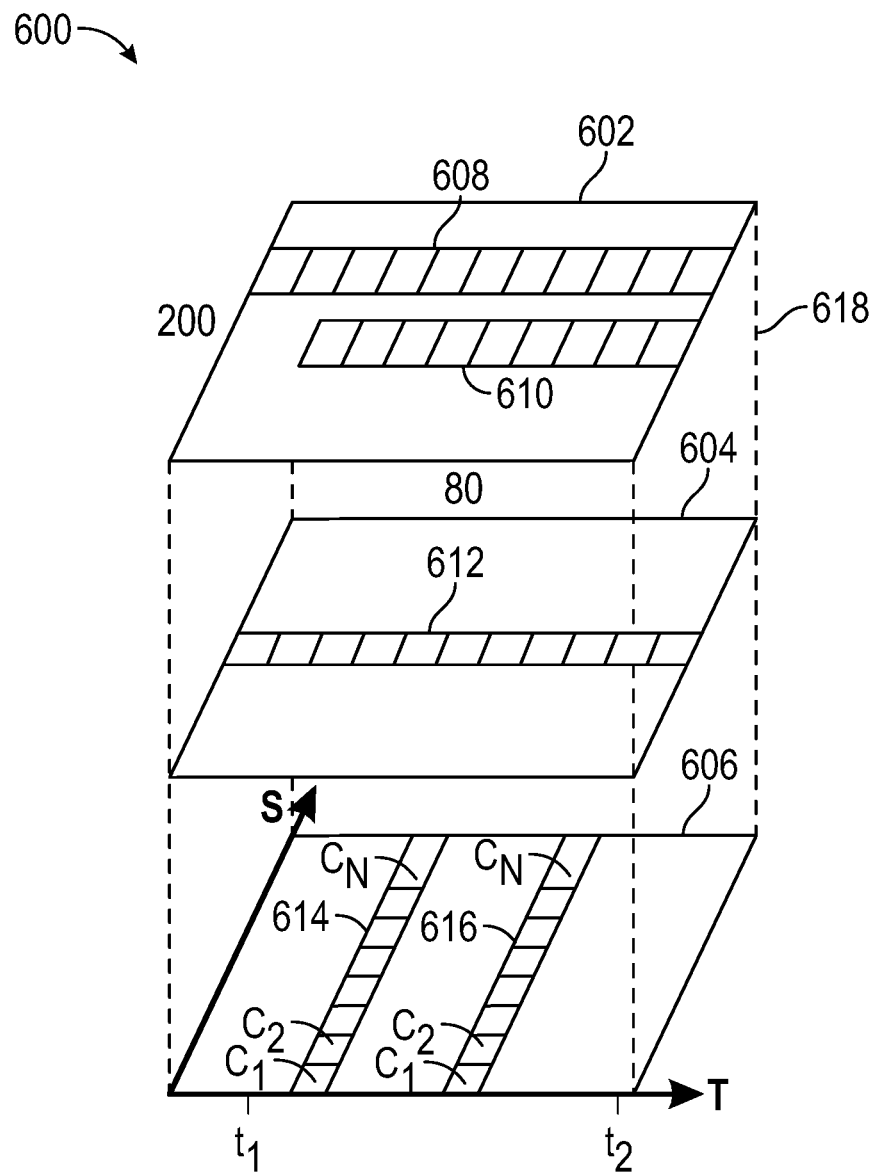
FIG. 6 illustrates a multi-layered tensor according to one embodiment.

FIG. 6 illustrates a multi-layered tensor 600 according to one embodiment. In one embodiment, multi-layered tensor 600 may include a three layer tensor which includes a multi-dimensional array of data. In the embodiment shown in FIG. 6, tensor 600 includes a plurality of a first, second, and third layers 602, 604, and 606, respectively. First layer 602 has data 608, 610 representing one or more obstacles (see FIG. 5B) on a path in which the ADV is moving. As shown, each of the three layers is a 200×80 pixel image and the layers collectively define a cube like object 618. Second layer 604 includes data 612 defining one or more stop lines representing one or more traffic rules (see FIG. 5B). Data 612 may be marked by color to represent one or more traffic rules such as a traffic light, stop sign, or pedestrian walkway. For example, a red color may represent a red traffic light. Third layer 606 includes data 614, 616, representing one or more curvatures of a path in which the ADV is moving. Curvature of a path (for example, a road) is a function of S or distance/position. Third layer 606 includes data 614 having a plurality of curvature values $C_1, C_2, \ldots C_N$ of a given path in which the ADV is moving. Curvature values $C_1, C_2, \ldots C_N$ may be between 0.0 and 0.05 for a straight road and for a turning road, the curvature value may be between 0.1 and 0.3. The larger the curvature value, the sharper the turning of the road. A machine-learning model may be applied to the plurality of layers of tensor 600 to generate a plurality of numerical values defining a potential path trajectory of the ADV to be described below. A 3×200× 80 pixel image tensor may be inputted to the machine-learning model to generate the plurality of numerical values.

Figure 7:
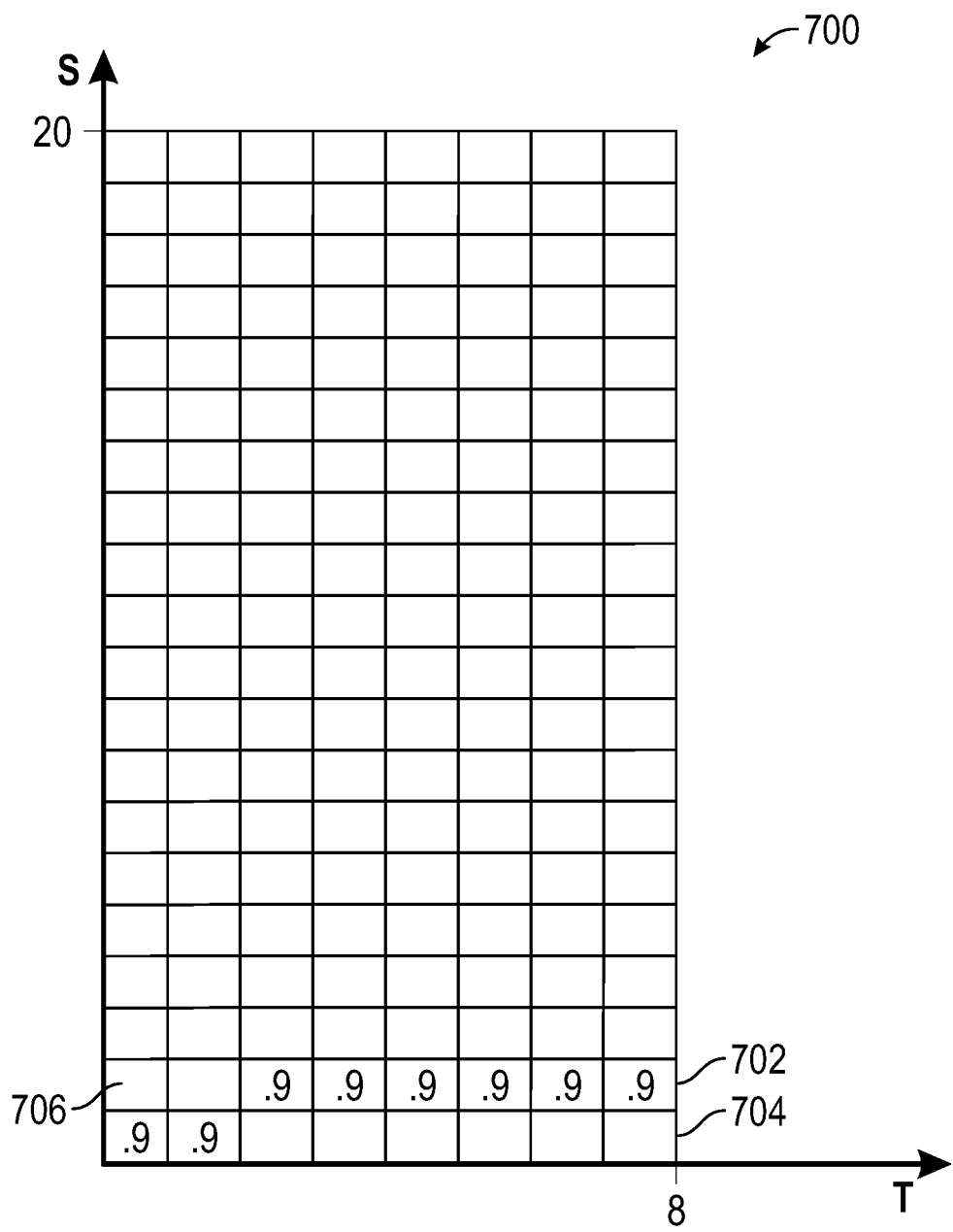
FIG. 7 illustrates a discretized probability distribution according to one embodiment.
Figure 8:
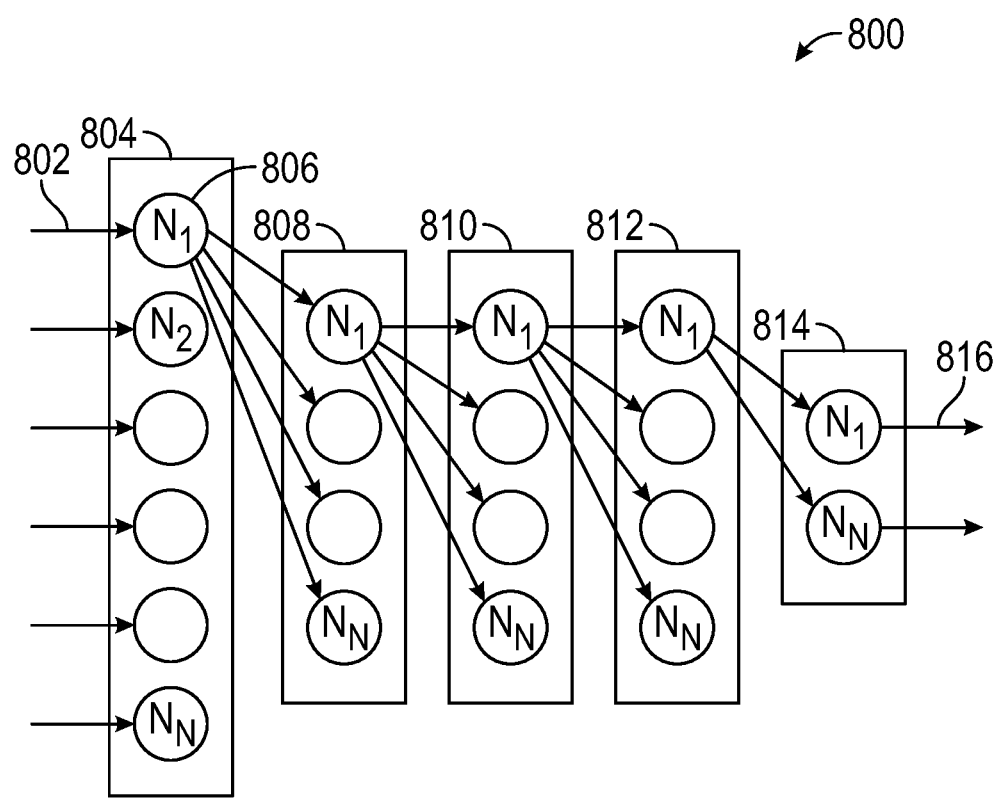
FIG. 8 is a block diagram of a convolutional neural network according to one embodiment.

With respect to FIGS. 7 and 8, a discretized probability distribution 700 according to one embodiment is shown which forms an output of a machine-learning model 800. In one embodiment, machine-learning model 800 includes a convolutional neural network which receives as input 802 a tensor such as tensor 600 (see FIG. 6) and outputs 816 the plurality of numerical values described above. The convolutional neural network conducts multiple tensor multiplication for the input tensor. After each multiplication, the size of the tensor becomes smaller, until the final tensor will be in the size of what is expected as the output size. Machine-learning model 800 includes input layer 804, convolution layers 808, 810, and 812, and output layer 814. Each machine-learning layer includes a plurality of nodes 806, $N_1, N_2, \ldots N_N$. The nodes are connected as shown by the arrows, not of all which are shown to simplify the description of the machine-learning model. The machine-learning model may be suitably trained by using suitable weights and other parameters to increase the accuracy of the output. Output 816 of the machine-learning model is shown in FIG. 7 as a discretized probability distribution 700 which includes a plurality of numerical values 702, 704 as described above. Probability distribution 700 includes a plurality of cells 706, each cell representing a probability that an ADV moves or drives to a position (S) as a function of time (T). In one example, a time resolution of 1 second and a distance resolution of 10 meters are used to generate a two dimensional 20×8 pixel image shown in FIG. 7 having 20 rows and 8 columns. As one example, numerical values 702, 704 include a probability, for example, a probability of 0.9 in each cell which represents a probability that the ADV 506 (see FIGS. 5A, 5B) moves or drives to that position (S) as a function of time (T). The probability values may range from 0 to 1. Hence, the numerical values 702, 704 define a potential path trajectory of the ADV 506. The numerical values 702, 704 are then used to determine a path trajectory of the ADV 506.

Figure 9:
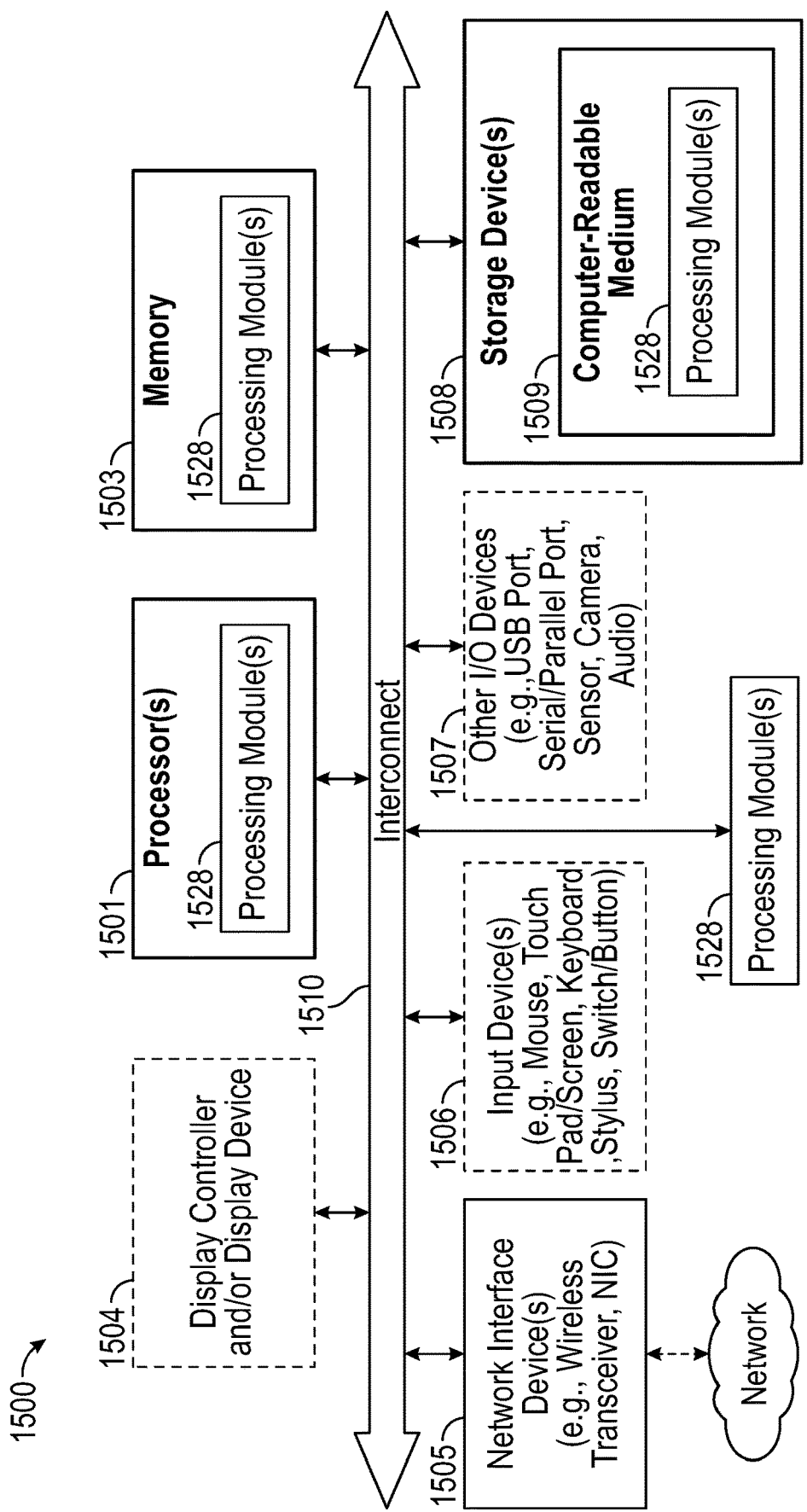
FIG. 9 is a block diagram illustrating a data processing system according to one embodiment.

FIG. 9 is a block diagram illustrating an example of a data processing system 1500 which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. In one embodiment, memory 1503 is coupled to processor 1501 to store instructions (for example, instructions represented by flow diagram 400 of FIG. 4) which when executed by processor 1501 cause processor 1501 to perform operations, the operations including generating a station-time (ST) graph based on perception data obtained from one or more sensors of the ADV, the ST graph including representing a location of an obstacle at different points in time, and obtaining a tensor based on the ST graph. The tensor includes a plurality of layers, the plurality of layers including a first layer having data representing one or more obstacles on a path in which the ADV is moving. The operations further include applying a machine-learning model to the plurality of layers of the tensor to generate a plurality of numerical values, the plurality of numerical values defining a potential path trajectory of the ADV, and determining a path trajectory of the ADV based on the plurality of numerical values.

Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Storage medium 1509 may include a non-transitory machine-readable medium having instructions stored therein, which when executed by a processor, cause the processor to perform operations, the operations including generating a station-time (ST) graph based on perception data obtained from one or more sensors of an autonomous driving vehicle (ADV), the ST graph including representing a location of an obstacle at different points in time, obtaining a tensor based on the ST graph, the tensor including a plurality of layers, the plurality of layers including a first layer having data representing one or more obstacles on a path in which ADV is moving, applying a machine-learning model to the plurality of layers of the tensor to generate a plurality of numerical values, the plurality of numerical values defining a potential path trajectory of the ADV, and determining a path trajectory of the ADV based on the plurality of numerical values.

Processing module/unit/logic 1528 may represent any of the components described above, such as, for example, decision module 304, planning module 305, or control module 306. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to determine a path trajectory for an autonomous driving vehicle (ADV), the method comprising:
    generating a station-time (ST) graph based on perception data obtained from one or more sensors of the ADV, the ST graph representing potential locations of an obstacle at different points in time;
    obtaining a tensor based on the ST graph, the tensor including a plurality of layers, the plurality of layers including a first layer having data representing one or more obstacles on a path in which the ADV is moving;
    applying a machine-learning model to the plurality of layers of the tensor to generate a plurality of numerical values, the plurality of numerical values defining a potential path trajectory of the ADV; and
    determining a path trajectory of the ADV based on the plurality of numerical values.

2. The method of claim 1, wherein the plurality of layers includes a second layer, the second layer having data representing one or more traffic rules.

3. The method of claim 2, wherein the plurality of layers includes a third layer, the third layer having data representing one or more curvatures of the path in which the ADV is moving.

4. The method of claim 1, wherein the plurality of numerical values includes a probability distribution.

5. The method of claim 4, wherein the probability distribution includes a plurality of cells, each cell representing a probability that the ADV moves to a position as a function of time.

6. The method of claim 3, wherein the machine-learning model includes a convolutional neural network.

7. The method of claim 6, wherein the convolutional neural network outputs the plurality of numerical values.

8. A non-transitory machine-readable medium having instructions stored therein, which when executed by a processor, cause the processor to perform operations, the operations comprising:
   generating a station-time (ST) graph based on perception data obtained from one or more sensors of an autonomous driving vehicle (ADV), the ST graph representing locations of an obstacle at different points in time;
   obtaining a tensor based on the ST graph, the tensor including a plurality of layers, the plurality of layers including a first layer having data representing one or more obstacles on a path in which ADV is moving;
   applying a machine-learning model to the plurality of layers of the tensor to generate a plurality of numerical values, the plurality of numerical values defining a potential path trajectory of the ADV; and
   determining a path trajectory of the ADV based on the plurality of numerical values.

9. The non-transitory machine-readable medium of claim 8, wherein the plurality of layers includes a second layer, the second layer having data representing one or more traffic rules.

10. The non-transitory machine-readable medium of claim 9, wherein the plurality of layers includes a third layer, the third layer having data representing one or more curvatures of the path in which the ADV is moving.

11. The non-transitory machine-readable medium of claim 8, wherein the plurality of numerical values includes a probability distribution.

12. The non-transitory machine-readable medium of claim 11, wherein the probability distribution includes a plurality of cells, each cell representing a probability that the ADV moves to a position as a function of time.

13. The non-transitory machine-readable medium of claim 10, wherein the machine-learning model includes a convolutional neural network.

14. The non-transitory machine-readable medium of claim 13, wherein the convolutional neural network outputs the plurality of numerical values.

15. A data processing system for an autonomous driving vehicle (ADV), the data processing system comprising:
   a processor; and
   a memory coupled to the processor to store instructions, which when executed by the processor, cause the processor to perform operations, the operations including:
      generating a station-time (ST) graph based on perception data obtained from one or more sensors of the ADV, the ST graph representing locations of an obstacle at different points in time,
      obtaining a tensor based on the ST graph, the tensor including a plurality of layers, the plurality of layers including a first layer having data representing one or more obstacles on a path in which the ADV is moving,
      applying a machine-learning model to the plurality of layers of the tensor to generate a plurality of numerical values, the plurality of numerical values defining a potential path trajectory of the ADV, and
      determining a path trajectory of the ADV based on the plurality of numerical values.

16. The data processing system of claim 15, wherein the plurality of layers includes a second layer, the second layer having data representing one or more traffic rules.

17. The data processing system of claim 16, wherein the plurality of layers includes a third layer, the third layer having data representing one or more curvatures of the path in which the ADV is moving.

18. The data processing system of claim 15, wherein the plurality of numerical values includes a probability distribution.

19. The data processing system of claim 18, wherein the probability distribution includes a plurality of cells, each cell representing a probability that the ADV moves to a position as a function of time.

20. The data processing system of claim 17, wherein the machine-learning model includes a convolutional neural network and the convolutional neural network outputs the plurality of numerical values.

* * * * *